2 Sheets—Sheet 1.

W. B. DUNNING.

STEAM HEATER.

No. 10,391. Reissued Oct. 9, 1883.

Attest:
Walter Donaldson
F. L. Middleton

Inventor
W. B. Dunning
by Joyce & Sykes
Attys.

N. PETERS. Photo-Lithographer, Washington, D. C.

W. B. DUNNING.

2 Sheets—Sheet 2.

STEAM HEATER.

No. 10,391.

Reissued Oct. 9, 1883.

Attest:

Walter Donaldson

F. L. Middleton

Inventor

W. B. Dunning by Joyce & Spear

Attys.

N. PETERS, Photo-Lithographer, Washington, D. C.

UNITED STATES PATENT OFFICE.

WILLIAM B. DUNNING, OF GENEVA, NEW YORK.

STEAM-HEATER.

SPECIFICATION forming part of Reissued Letters Patent No. 10,391, dated October 9, 1883.

Original No. 101,718, dated April 12, 1870; Reissue No. 8,569, dated February 4, 1879. Application for reissue filed June 26, 1883.

*To all whom it may concern:*

Be it known that I, WILLIAM B. DUNNING, of Geneva, in the county of Ontario and State of New York, have invented a new and useful Improvement in Steam-Heaters; and I hereby declare that the following is a full, clear, and exact description of the same.

My invention relates to steam-heating apparatus for buildings, particularly of that class in which the magazine or fuel-reservoir is located within an annular boiler.

It has for its object to obtain the compactness of form arising out of the location of the magazine within the annular boiler, together with proper draft and the exposure of the largest possible amount of surface of the boiler to the action of the products of combustion.

In ordinary steam-heating boilers it is necessary to frequently replenish the fuel upon the fire, which operation generally causes the steam to run down, or by neglect to replenish the fuel at the proper time steam ceases to be generated. Vents in all the ventilators must then be opened to allow the steam, as it is again raised, to enter and drive out the air—a troublesome process, especially in large buildings. In order conveniently to adapt a fuel-reservoir to a steam-generator, by which this difficulty can be avoided, I have constructed the boiler and combined the magazine therewith in the manner hereinafter described.

Figure 1:
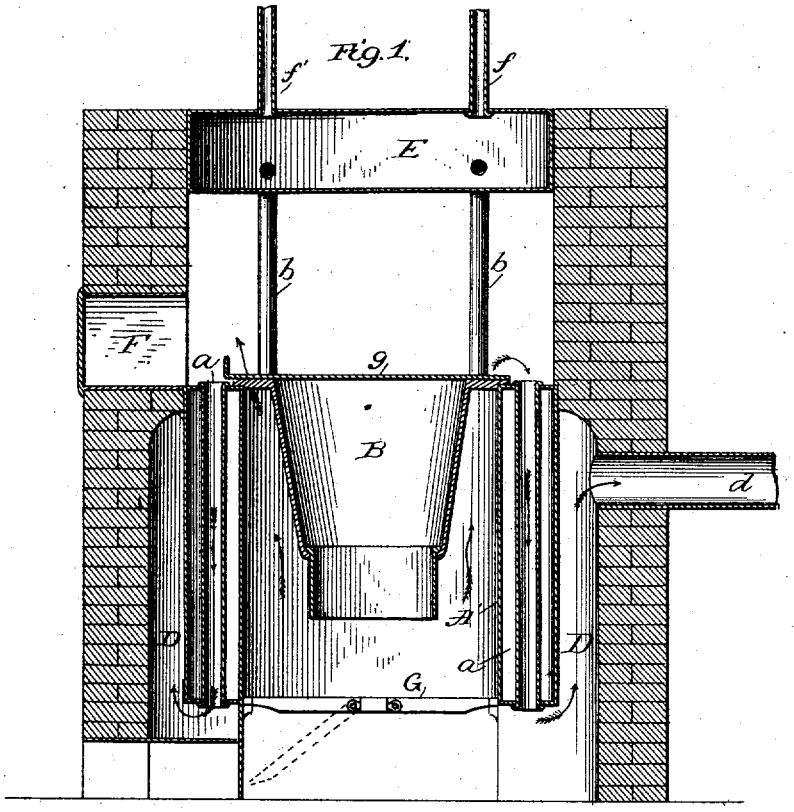
Figure 2:
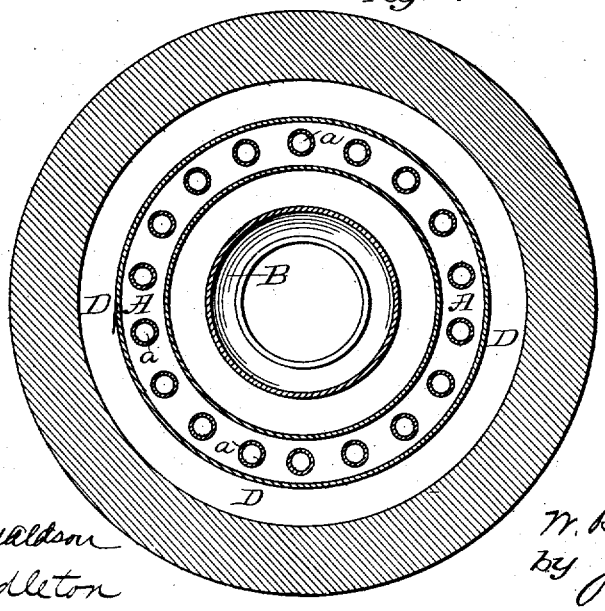
Figure 3:
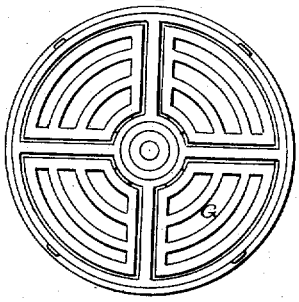
Figure 4:
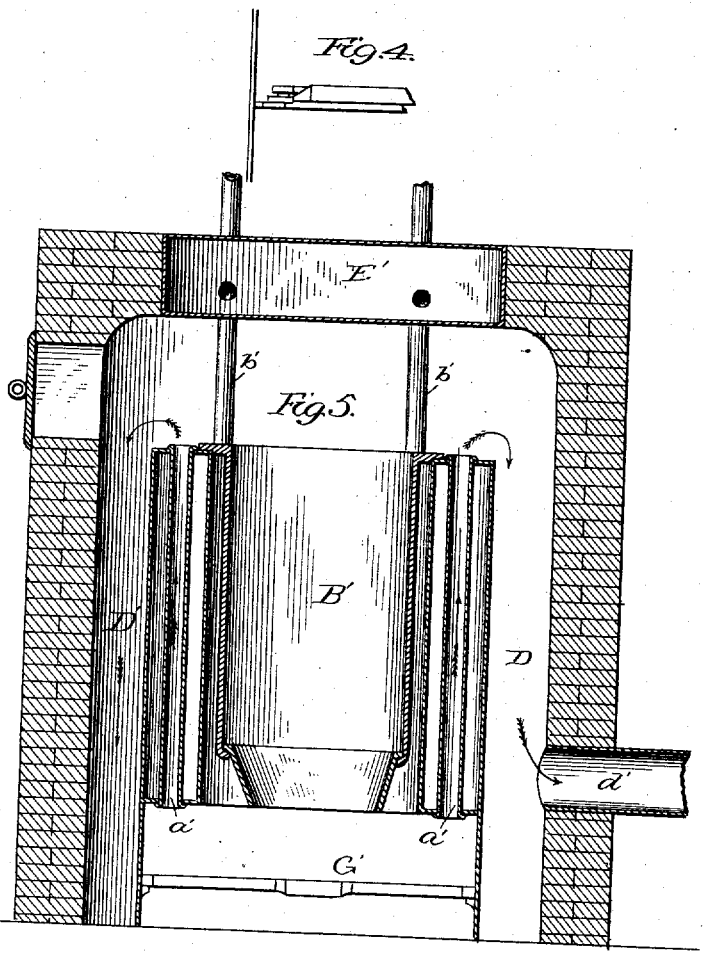

In the drawings, Figure 1 is a vertical central section of an apparatus embodying my invention. Fig. 2 is a plan view below the dotted line *x* in Fig. 1. Fig. 3 is a plan view of the fire-grate. Fig. 4 is a section of a portion of the same. Fig. 5 is a vertical section of a modification of my invention.

In Fig. 1 of the drawings the fuel-reservoir is represented at B, located centrally within the annular water-chamber A, and resting upon the upper edge of said water-chamber or boiler by means of suitable lugs. This reservoir extends down into the furnace to a proper point above the grate G. The water-chamber A is provided with vertical fire-tubes *a*. (Shown in longitudinal section in Fig. 1 and in the transverse section in Fig. 2.) It will be observed in the form shown in Fig. 1 that an annular space is left between the outer surface of the magazine and the inner surface of the water-chamber or boiler, through which the products of combustion can escape into the space above the said water-chamber or boiler. The products of combustion pass thence down the vertical flues in the water-chamber or boiler, through said chamber, and thence pass into the annular smoke-chamber D, formed by surrounding the shell of the boiler with a suitable projecting wall or jacket.

A steam-drum, E, is shown in Fig. 1, located above the top of the reservoir, leaving a space between it and the said reservoir, which may serve as a combustion-chamber for the smoke and gases. Communication is effected between the steam-drum and the water-chamber or boiler A by means of pipes *b*. A steam-pipe, *f*, and return water-pipe *f'* are shown in Fig. 1. Attached to the steam-drum, in the usual manner are safety-valve and other necessary appliances to be used in connection therewith. It is advisable to connect pipes *b* to the drum somewhat above the bottom of the latter, as shown in Fig. 1, whereby the bottom plate is kept constantly covered with water of condensation returning through the pipe *f'*. The bottom is thereby prevented from being burned by heat from the furnace. The products of combustion take the course indicated by the arrows in Fig. 1, passing between the reservoir and the interior of the shell A, returning through the flues *a* and ascending upon the outside of the shell A to the escape *d*.

It will be observed that by the above-described arrangement of heating-surfaces I expose both the inner and outer periphery of the shell A, as well as the lower side of the drum E and the inner surface of the flues *a*, to the action of the heat, thus economizing the heat to the greatest extent.

The fuel-reservoir B is covered by the slide *g*, which is drawn out into doorway F when the reservoir is being filled. Those of the flues *a* which are opposite the doorway F are covered by the slide when thus drawn out. The heat is thus prevented from rising from said flues, and the fuel from falling through the same into the chamber D. The lower portion of the reservoir B is made detachable, for the purpose of renewing it when burned.

In Fig. 5 I have shown another form of heater, differing, however, but slightly from that shown in Fig. 1, in which the products of combustion pass directly through the flues *a'* and return through the chamber D' to the pipe *d'*. The heat is not so fully economized as in the first-described arrangement; but it may be preferable in many locations, on account of requiring a less powerful draft.

The advantages of my invention are that the heat is very nearly all utilized by passing over the extended surfaces of the generator. Steam is kept up constantly by filling the fuel-reservoir at proper intervals, such operation occasioning no fluctuation in the steam-supply. All the parts of the apparatus are simple in construction and properly protected from destruction by heat. The position of the grate G is shown in the drawings. Its form does not differ materially from those in common use. It may be desirable to hinge each bar of the grate separately.

I am aware that an annular boiler with a central fuel-reservoir inseparably connected with or forming a part of said boiler, and with flues and smoke-passages wholly within said boiler, is not new.

What I claim is—

1. The outer smoke-chamber, D, annular water-chamber, and the vertical flues *a*, in combination with the centrally-located fuel-reservoir B, for the purposes set forth.

2. The arrangement of the steam-drum E with reference to the fuel-reservoir B and annular water-chamber A, and connected to the latter by pipes *b*, as and for the purposes set forth.

WILLIAM B. DUNNING.

Witnesses:
M. S. SANDFORD,
GEORGE S. PRINCE.